Patented July 27, 1926.

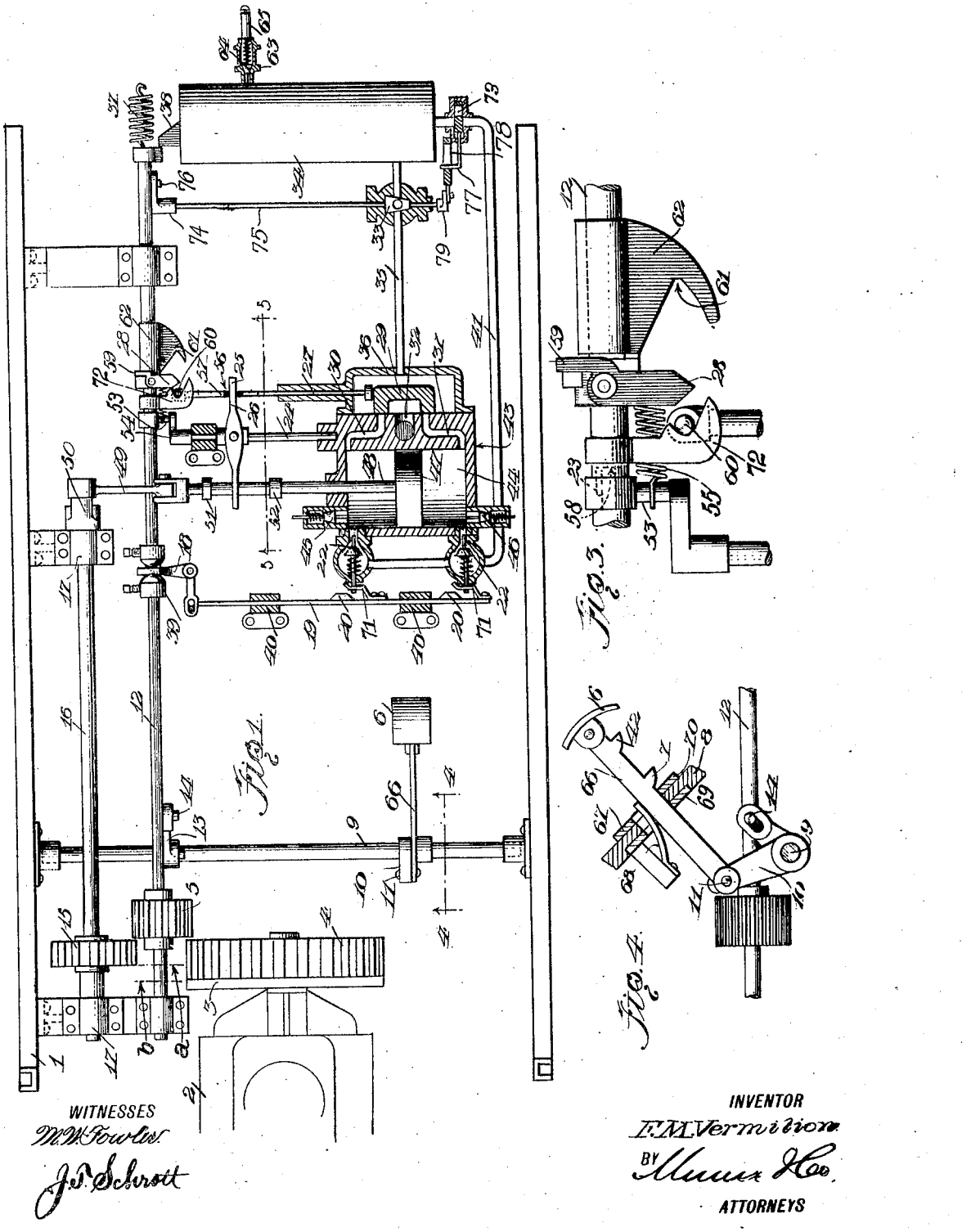

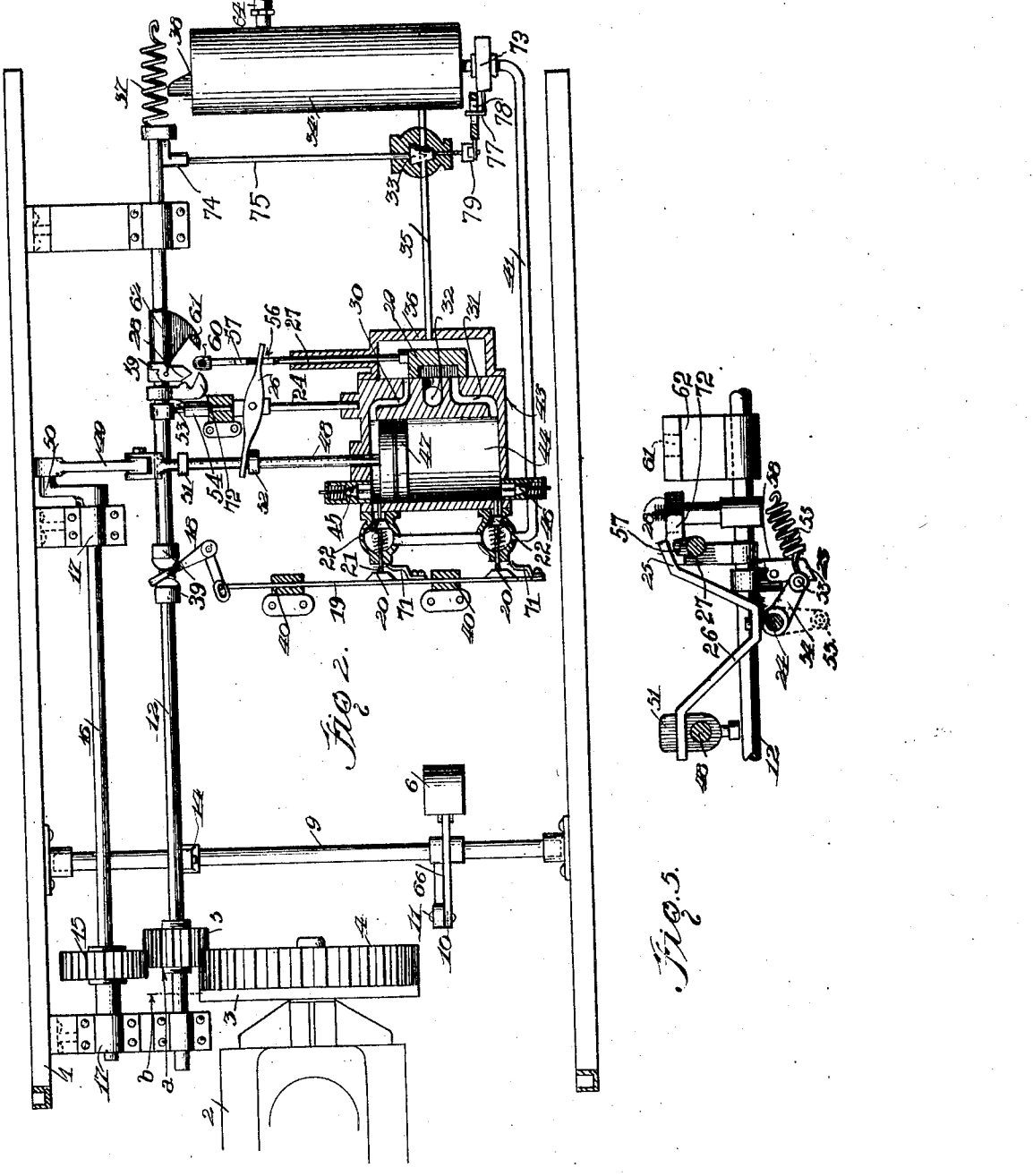
July 27, 1926.
F. M. VERMILION
1,593,810
COMPRESSED AIR AUTOMOBILE STARTER
Filed Nov. 28, 1922
3 Sheets-Sheet 2
WITNESSES
INVENTOR
F.M. Vermilion
BY
ATTORNEYS July 27, 1926.  
F. M. VERMILION  
COMPRESSED AIR AUTOMOBILE STARTER  
Filed Nov. 28, 1922  
1,593,810  
3 Sheets-Sheet 3
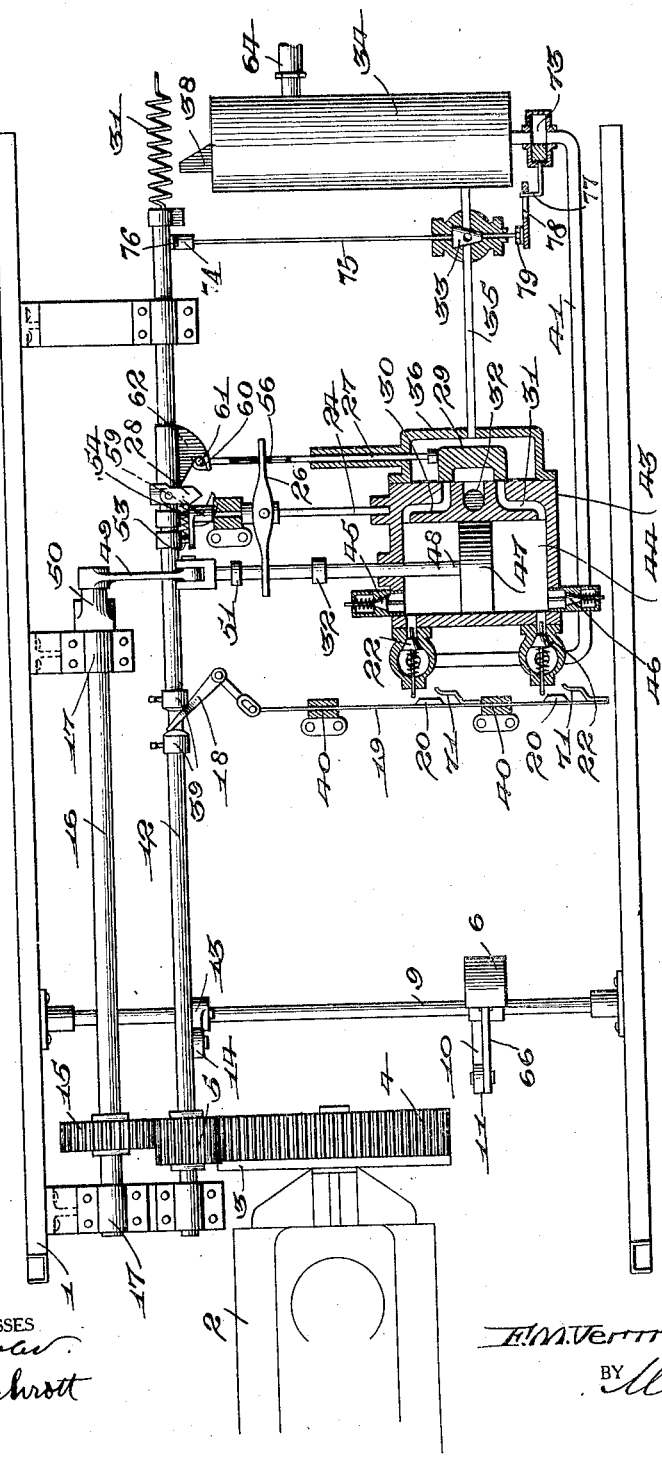

1,593,810

UNITED STATES PATENT OFFICE.

FRANCIS M. VERMILION, OF SHATTUCK, OKLAHOMA, ASSIGNOR OF ONE-THIRD TO LEROY F. HAMMOND, OF HIGGINS, TEXAS.

COMPRESSED-AIR AUTOMOBILE STARTER.

Application filed November 28, 1922. Serial No. 603,826.

My invention relates to improvements in automobile starters and it consists of the constructions, combinations and mode of operation herein described and claimed.

An object of the invention is to provide a starter for automobile engines which is adapted to be operated by any suitable pressure fluid but preferably by compressed air.

A further object of the invention is to provide means for restoring the pressure of air in the tank immediately after carrying out a starting operation.

Other objects and advantages will appear in the following specification, reference being had to the accompanying drawings, in which:

Fig. 1 is a plan view with parts in section, illustrating the normal and non-operative positions of the starter mechanism.

Fig. 2 is a view similar to Fig. 1 illustrating how the starter works upon depressing the starter pedal once, Fig. 3 is a detail plan view of parts of the mechanism on the shifting shaft, Fig. 4 is a detail cross section on the line 4—4 of Fig. 1, illustrating the construction of the starter pedal and associated parts, and Fig. 5 is a detail cross section on the line 5—5 of Fig. 1.

Figure 6 is a view similar to Figure 1 illustrating the apparatus in position to operate as a pump.

In the drawings, 1 is the chassis of an automobile or other motor vehicle upon which is mounted the engine 2. The fly wheel 3 of the engine has a part of the periphery formed into a spur gear 4 so that engagement of the starter pinion 5 may be made when the starter pedal 6 is depressed once so as to bring the first stop 7 (Fig. 4) into engagement with the under side of the foot-board 8.

This depression of the starter pedal 6 rocks the countershaft 9 through the arm 10 which is carried by the shaft and is connected to the arm at 11 (Fig. 4), and the shifting shaft 12 is accordingly moved a predetermined distance toward the left (Fig. 1) through the medium of another arm 13 also carried by the shaft 9 and attached to the shaft 12 by the pin and slot connection 14. The left-wise movement of the shaft 12 brings the starter pinion 5 into engagement with the spur gear 4 and also into engagement with the starter gear 15 on a shaft 16 which is supported in bearing 17.

The aforesaid left-wise movement of the shifting shaft 12 performs a number of operations, first, engages the starter pinion 5 with the gears 4 and 15 (as already stated); second, causes the rocking of a bell crank 18 and the downward shifting of a rod 19, the cams 20 of which will then move into position beneath the stem 21 of valves 22 and close these valves; third, causes the dog 23 (Fig. 5) to slightly turn the shaft 24 so as to bring the right end 25 of the rocker 26 (Fig. 1) into engagement with the valve rod 27; fourth, causes the cam 28 to ride over the end of the valve rod 27 and move the slide valve 29 out of the neutral position over the inlet ports 30 and 31 and the exhaust port 32; fifth, causes the opening of the compressed air valve 33 so that air from the tank 34 may flow through the pipe 35 into the valve chest 36 for the operation of the starter engine; and sixth, puts the spring 37 under tension in readiness to pull the shifting shaft 12 back against the stop 38 when the pedal 6 is finally released.

Shifting of the bell crank 18 is accomplished by a pair of collars 39 with opposing rounded ends fixed upon the shaft 12. The cam rod 19 is supported in bearing 40 which in turn may be attached to any adjacent fixed part of the chassis. The valves 22 are air outlet valves through which air is adapted to be pumped into the pipe 41 and in turn back into the tank 34 at such times when the starter pedal is depressed to the limit and when the stop 42 engages beneath the foot board 8.

At such a time, namely, when the starter engine 43 is operated as a pump, air is drawn into the cylinder 44 through intake valves 45 and 46 by the reciprocations of the piston 47. This piston is on a rod 48 which carries a connecting rod 49 joined to a crank 50 on the starter shaft 16. A pair of lugs 51 and 52 actuate the rocker 26 when the engine 43 operates as a starter.

The dog 23 is located on the underside of the shifting shaft 12 and upon the aforesaid primary movement of the shaft, is adapted to engage a pin 53 (Figs. 1, 3 and 5) which extends out from a crank 54 in the same direction as the rocker shaft 24. A spring 55 is attached to this pin and the engagement of the dog 23 with the pin puts the spring under tension and keeps it so (as well as it keeps the shaft 24 in the rocked position) until the operator either releases the pedal 6 or presses it down again in order to accomplish a pumping operation. In the last event, a further movement of the shaft 12 toward the left will result and as a consequence, the dog 23 will pass over the pin 53 (then in the dotted line position in Fig. 5) so that the spring 55 is free to pull the pin back and restore the rocker shaft 24 to its original position.

While in this original position, the rocker 26 of the shaft 24 assumes a position somewhat as illustrated in Fig. 5, the right end 25 being disposed above the passage 56 between shoulders 57 on the valve rod 27. The member 26 is capable not only of rocking (by virtue of which fact it is called a "rocker") but is also capable of partially revolving due to its mounting on the shaft 24. The latter function occurs when the shaft is rocked by means of the dog 23 and the right end 25 is brought down into engagement with the valve rod 27 so that it may drop into the passage 56. The former function occurs when the engine 43 operates as a starter, at which time the lugs 51 and 52 actuate the rocker to reciprocate the valve rod 27 and valve 29. The lugs 51 and 52 are made high enough so that moving the right end 25 of the rocker 26 into engagement with the rod 27 will not move the left end of the rocker out of the zone of the lugs 51 and 52.

It is to be observed in Fig. 5 that the dog 23 has a stop shoulder 58 at one side of the pivot. The purpose of the stop shoulder is to make the dog rigid while moving toward the left, at which time it carries the pin 53 into the dotted line position, but to enable the dog to rock on its pivot upon the return of the shaft 12 and when the dog encounters the pin 53 from the left side so that the dog may again assume its position in full lines in readiness for another operation. The cam 28 works on the same principle as the dog 23 because it has a stop shoulder 59 which makes the cam rigid when moving leftwise but enables the cam to pass the end of the rod 27 upon the return of the shaft. There is an upright pin 60 on the end of the valve rod 27, the obvious purpose of which is to reach the cam 28 and also the recess 61 of a centering or neutralizing means 62. This centralizing means comes into play upon the second depression of the pedal 6, the inclined surfaces adjacent to the recess 61 moving the pin 60 toward said recess and consequently shifting the valve 29 into a neutral position over the ports which it controls. A similar neutralizing means 72 serves to replace the valve in neutral upon release of the pedal after only one depression.

In order that the pressure of air in the tank 34 may not become excessive, provision is made of a poppet valve 63 which is held seated by a spring 64 of a predetermined strength. When this strength is exceeded by the pressure of air in the tank, the valve becomes unseated and a whistle 65 is caused to blow, sounding an alarm to warn the operator to restore the pedal 6 from the pumping position 42 to the original position in Fig. 4. In this connection it is to be observed that the shank 66 of the starter pedal passes through a slot 67 in the footboard, the slot being long enough to let the stops 7 and 42 pass through when the pedal is depressed. A leaf spring 68 presses the shank forwardly in the slot and also insures contact of the stops with the underside of the footboard. The slot is faced with plates 69 and 70 to prevent wear.

The operation may be briefly reviewed, although the details thereof are described in connection with the description of the mechanism above. Assume the parts to be in the normal or non-operative position in Fig. 1. The engine 2 is at rest, the pedal 6 is extended to the limit, the piston 47 is in a mid position where it stops at the end of the last operation by virtue of the weight of the crank 50, the slide valve 29 is in a neutral position where it closes all ports to the cylinder 44, the rocker 26 is in the position shown in Fig. 5 wherein the right end 25 is lifted from the valve rod 27, the air valve 33 is closed, and brackets 71 on the rod 19 hold the valves 22 open thereby relieving the cylinder 44 of all compression and permitting the crank 50 to gravitate as stated. The air valve 33 is turned by a crank 74 which is carried by the stem 75 of said valve. The crank is connected at 76 (Figs. 1 and 6) with the shaft 12 so that shifting movements of the shaft will turn the valve 33. It is also necessary to close off the air reservoir 34 at such time, and a control valve 73 is provided for this purpose. The control valve includes a bent arm 77 providing a pin which occupies the slot 78 of an articulated connection 79 on the continuation of the foregoing valve stem 75. The slotted connection permits the opening of the air valve 33 when shifting the parts from the position in Figure 1 to the position in Figure 2, without opening the control valve 73. The aforesaid limit of extension of the pedal shank 66 is fixed by the engagement of the stop 38 toward which the shifting shaft 12 is pulled by the spring 37.

Assume now that the operator desires to start the engine. The starter pedal 6 is depressed until the first stop 7 comes into engagement with the face plate 69 on the underside, the pull of spring 37 through the shifting shaft 12, arm 13 and arm 10, holding the stop in such engagement.

The rocking of the countershaft 9, resulting from the primary depression of the pedal 6, causes the starter pinion 5 to move approximately to the position *a* at which position it engages both the spur gear 4 on the fly wheel 3 and the starter gear 15. An approximately similar length of movement occurs in other parts which have connection with the shifting shaft 12. For example, the bell crank 18 rocks far enough to bring the cams 20 beneath the stems 21 of the valves 22 so as to lock them, however, first displacing the brackets 71 so that they may close. The shaft 24 is rocked sufficiently to bring the right end 25 of the rocker 26 into engagement with the valve rod 27. The cam 28 shifts the valve rod 27 downwardly a sufficient distance to cause the valve 28 to uncover the inlet port 30, and the valve 33 is opened so as to admit air from the tank 34. Air under pressure thereupon enters the upper end of the cylinder 44 and drives the piston 47 downwardly. The inlet valves 45 and 46 cannot open because the internal pressure holds them closed.

Said shifting of the valve rod 27 brings the passage 56 into place under the rocker 26 so that the end 25 drops into place. The downward movement of the piston 47 soon brings the lug 51 against the adjacent end of the rocker so that the latter is rocked upon its pivot and the valve 29 slid upwardly to open the inlet port 31 and place the other inlet port and the exhaust port 32 in communication. The piston 47 is now driven upwardly and similar cycles of operation are repeated until the automobile engine 2 starts. Assume now that the operator desires to replenish the tank with air. Further depression of the pedal 6 brings the stop 42 into engagement with the underside of the face plate 69 and also causes the countershaft 9 to rock further and the shifting shaft 12 to move further to the left until the starter pinion 5 approximately assumes the position *b*. The further shifting of the cam rod 19 resulting from the second depression of the pedal 6 causes the cams 20 to pass the valve stems 21 so that the valves 22 are free to open. The dog 23 releases the pin 53 of the arm 54 (Fig. 5) so that the spring 55 revolves the shaft 24 to its former position at which time the end 25 of the rocker 26 has moved out of the passage 56. The valve 29 is also moved to the original neutral position shown in Fig. 1, by reason of the fact that the neutralizing means 62 moves upon the pin 60 and causes the centering of the valve.

As the engine 2 is now running, the fly wheel 3 becomes the driver for the engine 43, and at each reciprocation of the piston 47, air is drawn into one or the other end of the cylinder 44 through inlet valves 45 and 46, the same air being discharged at the valves 22 and so into tank 34. The air valve 33 was closed and the valves 73 opened on the aforesaid second shifting of the shaft 12 so that no air can escape from the tank in the particular operation now under discussion. A further depression of the pedal 6 so that the stop 42 can be freed from the face plate 69, enables restoring all parts to the original position in Fig. 1.

While the construction and arrangement of the improved automobile starter as herein described and claimed is that of a generally preferred form, obviously modifications and changes may be made without departing from the spirit of the invention or the scope of the claims.

I claim:—

1. In combination with an engine having a part to be driven, a starter engine having driving means adjacent to said part, a reservoir of working fluid for the starter engine, means to control the passage of fluid from the reservoir to the engine, means to control the passage of fluid from the engine to the reservoir, a shiftable member having an idle element engageable with said driven and driving means, means operable by said shiftable member to actuate said fluid reservoir control means, other means operable by said shiftable member to actuate said engine fluid control means, and a pedal in connection with said shiftable member arranged to be primarily depressed to move the idle element into engagement with the driving and driven means, cause one operable means to hold closed the fluid control means from the engine and cause the other operable means to open the control means from the reservoir to the engine and thereby cause the engine to operate as a starter, and upon a second depression to close the control means from the reservoir and enable opening of the control means from the engine and further shift the idle element in respect to the now driving means and now driven means but without disengaging, to thereby cause the operation of the engine as a pump to replenish the reservoir with working fluid.

2. In combination with an automobile engine having means to be driven, a starter engine having driving means adjacent to the driven means, a tank of working fluid for the starter engine, a normally closed valve for controlling the flow of fluid from the tank to the starter engine, check valves for admitting fluid from the starter engine to the tank but preventing a back flow of fluid from the tank to said engine, a shaft having a loose pinion, means adapted to be actuated by the shaft to close the check valves against opening when the engine is operated as a starter, means adapted to be actuated by the shaft to open the fluid valve, and means arranged to be primarily pressed to shift the shaft for the engagement of the pinion with said driving and driven means, cause the closure of said check valves and the opening of the fluid valve so that the starter engine may operate the driven means, and arranged to be secondarily operated to again cause the closing of said valve and the release of the check valves so that the driven part, now operated by the engine, may cause the operation of the starter engine as a pump to replenish the tank.

3. In combination with an engine having means to be driven, a starter engine having driving means adjacent to said driven means, a tank containing working fluid for the starter engine, a normally closed valve controlling the flow of fluid from the tank to the starter engine, a slide valve normally in a neutral position over the starter engine ports, outlet check valves situated in a passage between the starter engine and the tank, a shaft which is adapted to be shifted and which carries an idle pinion, a rod having cams adapted to be moved upon shifting of the shaft, means to move the slide valve from the neutral position upon shifting of said shaft, means to open the fluid valve upon shifting of said shaft, and means in connection with the shaft adapted to be moved a predetermined distance to connect the idle pinion with the driven and driving means, cause the cams on said rod to hold the check outlet valves closed, shift the slide valve and open the fluid valve so that the starter engine may operate to drive the driven means, and adapted to be moved a further distance to shift the cams from the outlet valves, restore the slide valve to the neutral position and close the fluid valve, the driven means then causing the starter engine to act as a pump to replenish the fluid in the tank.

4. In combination with an engine having means to be driven, a starter engine having driving means adjacent to said driven means, a source of operating fluid for the starter engine, a slide valve normally assuming a neutral position over the ports of the starter engine, a shiftable shaft having a loose pinion, a pedal arranged to be primarily depressed a certain distance to shift the shaft and move the pinion into engagement with the driving and driven means, means carried by the shaft to thereupon shift the slide valve from the neutral position so that fluid may enter to operate the engine, and means carried by said shaft to again centralize the slide valve in respect to said ports upon a second depression of the pedal.

5. In combination with an engine having means to be driven, a starter engine having driving means adjacent to said driven means, a shiftable shaft having an idle pinion, a pedal having connections to the shaft to shift the pinion into engagement with the driving and driven means upon the first depression of the pedal, a source of operating fluid for the starter engine, a slide valve normally in a neutral position over the starter engine ports, means carried by the shiftable shaft adapted to shift the slide valve from said position upon the first depression of the pedal to admit fluid for the operation of the starter engine, means adapted to again shift the slide valve into its former neutral position upon a second depression of the pedal, and means enabling the first slide valve shifting means to pass without disturbing the slide valve upon restoring the pedal to the original position.

6. In combination with an engine having means to be driven, a starter engine having driving means adjacent to said driven means, a shiftable shaft having a loose pinion, a pedal having connections with the shaft and adapted to be depressed a predetermined distance to move the pinion into engagement with said driving and driven means, a source of operating fluid for the starter engine, a slide valve normally in a neutral position over the starter engine ports, a cam carried by the shaft and adapted to shift the valve out of the neutral position upon said depression of the pedal to admit fluid for the operation of the starter engine, neutralizing means carried by the shaft and adapted to restore the slide valve to the former neutral position over said ports and cut off the fluid upon a second depression of the pedal a predetermined distance, and a pivotal mounting for said cam allowing the cam to yield only upon a return movement of the shaft when said pedal is restored to the original position.

7. In combination with an engine having means to be driven, a starter engine having driving means adjacent to said driven means, a tank containing air under pressure to actuate the starting engine for the operation of said engine, outlet valves at the extremities of the starter engine cylinder, a shiftable shaft having an idler pinion through which the work of the starter is imparted to the engine, a pedal in connection with the shaft adapted to be depressed twice, the first depression moving the shaft to bring the pinion into engagement with the driving and driven means, means then admitting compressed air for the operation of the starter engine upon said movement of the shaft, a cam rod having cams moved into position upon said first depression of the pedal to hold said valves in a closed position, said cams releasing the valves on the continued movement of the cam rod upon the second depression of the pedal, and a pipe furnishing communication between the valves and tank to replenish the air supply through the operation of the starting engine as pump while the idler pinion is yet in engagement with now driving and driven means.

8. In combination with an engine having means to be driven, a starter engine having driving means adjacent to said driven means, a slide valve normally in a neutral position over the starter engine ports and having a rod with shoulders forming a passage, a pivoted rocker having one end disposed over the valve rod and above the shoulders and the other end between lugs on the piston rod of the starter engine, a shiftable shaft having a pinion, a pedal with connections to the shaft adapted to be depressed to shift the shaft and move the pinion into engagement with said driving and driven means, means normally holding the rocker in the aforesaid position, and means carried by said shaft operating against said holding means when said pedal is depressed to move one end of the rocker toward the valve rod in readiness to drop into said passage but not moved far enough to raise the other end above said lugs.

9. In combination with an engine having means to be driven, a starter engine having driving means adjacent to said driven means, a fluid controlling slide valve normally in a neutral position over the starter engine ports and having a rod with shoulders forming a passage, a pivoted rocker having one end disposed over the valve rod and above the shoulders and the other end between lugs on the piston rod of the starter engine, a shiftable shaft having a pinion, a pedal with connections to the shaft adapted to be depressed to shift the shaft and move the pinion into engagement with said driving and driven means, means normally holding the rocker in the aforesaid position, means carried by said shaft operating against said holding means when said pedal is depressed to move one end of the rocker toward the valve rod in readiness to drop into said passage but not moved far enough to raise the other end above said lugs, and means also carried by the shaft to shift the valve rod, bring said passage beneath the rocker and move the slide valve from the aforesaid neutral position to admit fluid to the starter engine.

10. In combination with an engine having means to be driven, a starter engine having driving means adjacent to said driven means, a piston having a rod with a pair of spaced lugs included in said engine, a slide valve having a rod with a pair of shoulders forming a passage, a rocker having one end between said lugs and the other end disposed above the shoulders on said rod, a partially revoluble shaft upon which said rocker is pivotally mounted, a shiftable shaft having a loose pinion, a pedal in connection with the shaft adapted to be depressed to move the shaft and engage the pinion with said driving and driven means, resilient means normally holding the rocker shaft and rocker in the aforesaid position, and means carried by the shiftable shaft arranged to partially rock the shaft against the tension of said means to move one end of the rocker upon the valve rod in readiness to enter the passage without moving the other end of the rocker above the lugs on the starter engine piston rod.

11. In combination with an engine having means to be driven, a starter engine having driving means adjacent to said driven means, a piston having a rod with a pair of spaced lugs included in said engine, a slide valve having a rod with a pair of shoulders forming a passage, a rocker having one end between said lugs and the other end disposed above the shoulders on said rod, a partially revoluble shaft upon which said rocker is pivotally mounted, a shiftable shaft having a loose pinion, a pedal in connection with the shaft adapted to be depressed to move the shaft and engage the pinion with said driving and driven means, resilient means normally holding the rocker shaft and rocker in the aforesaid position, means carried by the shiftable shaft arranged to partially rock the shaft against the tension of said means to move one end of the rocker upon the valve rod in readiness to enter the passage without moving the other end of the rocker above the lugs on the starter engine piston rod, and a cam carried by the shiftable shaft to move the slide valve from the neutral position for the admission of fluid to the starter engine and enable the rocker to enter said passage for the resulting reciprocation of the slide valve by the reciprocation of the piston rod.

12. In combination with an engine having means to be driven, a starter engine having driving means adjacent to said driven means, a tank containing compressed air for the operation of the starter engine, a valve to control the flow of air from the tank to the engine for the operation thereof, valves for controlling the passage of air from the engine to the tank for the replenishment of the latter, a shiftable shaft having a loose pinion, resilient means normally holding the shaft against a stop, a starter pedal having a shank with a stop which is adapted to hold the shank at a predetermined place of depression, means connected between the shank and the shaft causing the pinion to engage the driving and driven means, means operated by the shaft to open the control valve from the tank, means operated by the shaft to prevent the outlet valves from opening, and another stop on the shank limiting it at another place of depression at which time the shiftable shaft is moved further, causing the closing of the tank-controlled valve and the release of the outlet valves enabling the starter engine to replenish the tank by virtue of operation by said engine driven means, said shank being held in its various positions by the tension of the spring on said shiftable shaft.

13. An automobile starter comprising a starter engine, a piston included in the engine having connections to a crank on an operating shaft, a compressed air reservoir, an air valve to control the flow of air from the reservoir to the engine, a pair of valves controlling a passage from the engine to the reservoir, a closed control valve in said passage, a rod having brackets to engage the valve stems and hold said pair of valves open when the engine is inoperative as a starter, thereby relieving the engine cylinder from pressure so that the crank will gravitate and centralize the piston, a shifter shaft having one connection to the rod and another connection to operate both the air and control valves, said rod displacing the brackets to permit the pair of valves to close, said second connection opening the air valve, means on the rod to then engage the valve stems to lock said pair of valves closed, and means in said control valve connection permitting the opening of said air valve without opening the control valve.

FRANCIS M. VERMILION.